United States Patent Office

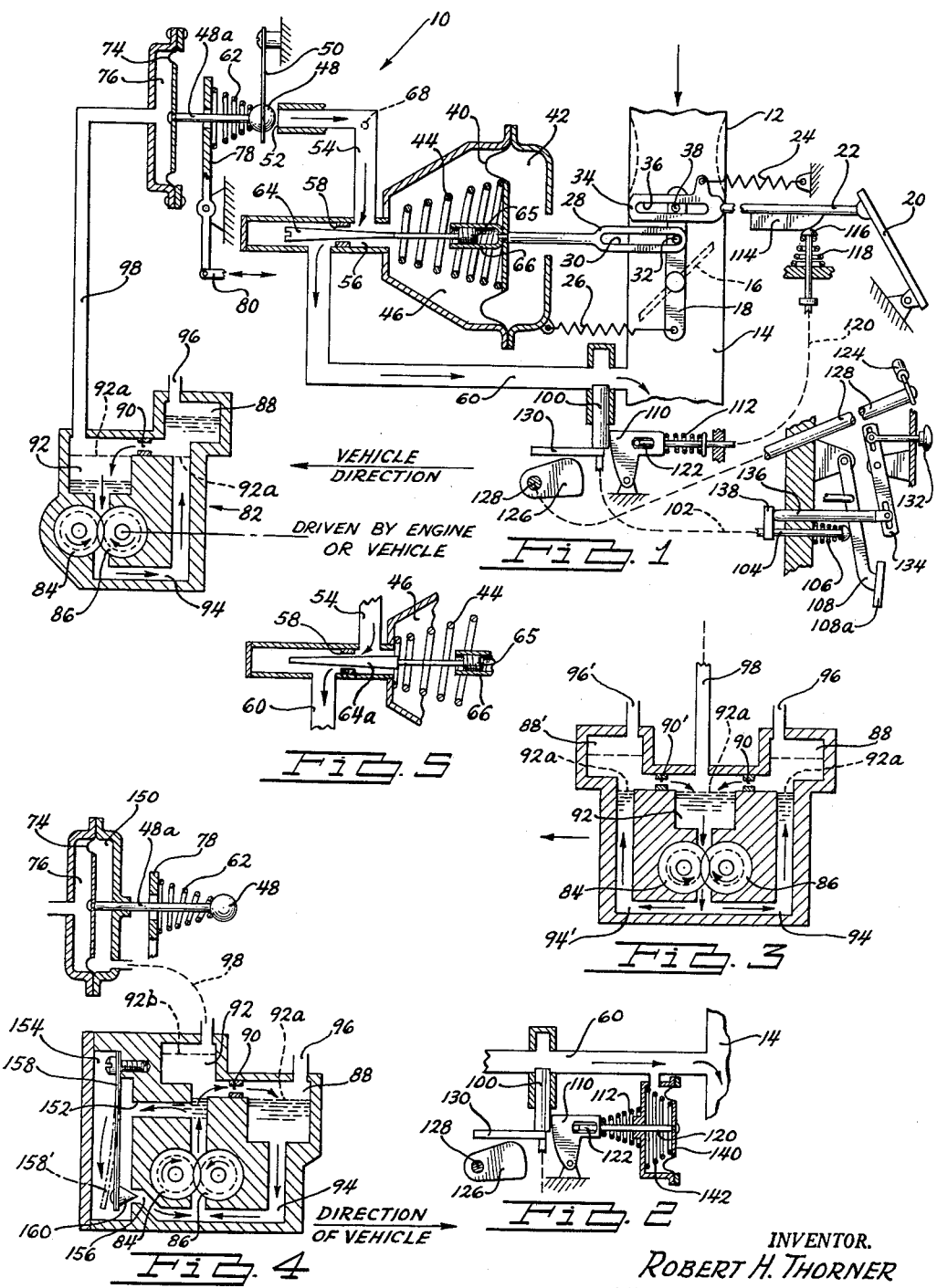

3,213,691
Patented Oct. 26, 1965

3,213,691
SPEED REGULATOR DEVICE
Robert H. Thorner, 3410 W. Chicago Blvd.,
Detroit, Mich.
Filed Jan. 16, 1961, Ser. No. 82,769
8 Claims. (Cl. 73—497)

The present application is a continuation-in-part of application Serial No. 683,318, filed September 11, 1957, entitled Fluid Pressure Sensing Governor (now Patent No. 3,084,758); Serial No. 712,847, filed February 3, 1958, (now Patent No. 3,114,427 entitled Control Apparatus for Motor Vehicle Regulator; Serial No. 815,177, filed May 22, 1959, entitled Speed-Regulating Mechanism (now Patent No. 3,068,849) and Serial No. 74,315, filed December 7, 1960, (now Patent No. 3,153,325) entitled Speed Regulating Device.

The present invention relates primarily but not necessarily to speed regulators for automotive engines, and is particularly directed to a novel fluid servo-mechanism, novel sensing means thereof, and novel control means therefor.

In regulators having a fluid servo-motor controlled by a pilot valve, such as speed regulators, the elimination of undesirable fluid static and dynamic forces acting on the valve has always been a puzzling problem. This problem is significant in modulating-type pilot valve structures, and is most severe in the environment of the single-acting type servo-motor. When a "closed-loop" regulator is responsive to a controlled condition, it is usually desirable for the pilot valve to respond to changes in the controlled condition substantially independent of static and fluid dynamic forces acting on the valve.

The disturbing or unbalancing fluid forces acting on a pilot valve, as above discussed, are produced by at least two basic factors. One important factor is the variation in the source pressure acting on the pilot valve, when such variation is significant in relation to the sensing or signal forces which actuate the pilot valve. Another factor, for a constant value of the source pressure, comprises the two fluid force variations acting on the pilot valve as the valve travels throughout its operating range; one of these fluid force variations comprises the changes in force produced by the static pressure acting on the uncompensated but varying effective area of the pilot valve which is exposed to the source pressure; the second of these force variations is the fluid dynamic (Bernoulli) effect produced on the pilot valve by the changing velocity of the controlled fluid as the valve changes its travel-position.

In my copending application, Serial No. 815,177, two means are disclosed to compensate for the above described unbalancing forces; one means provides a disc to oppose and cancel the unbalance forces of the pilot valve; and the second means provides a pressure regulator to control the fluid pressure before it reaches the pilot valve. While these means are very effective, they do require some additional mechanism. Also, in the regulator of the aforesaid copending application, the pilot valve varies simultaneosuly the apertures of the inlet and outlet orifices of the single-acting pressure (vacuum) chamber of the servo-motor. This, of course, is highly desirable because the complete range of fluid pressure is available to the servo-motor with a very fast change of pressure for a given pilot valve travel.

However, in certain regulator applications, such as for an automotive speed regulator in turnpike driving, reduction of cost is highly critical in order for such devices to gain wide public acceptance. Such desirable reduction of cost can best be achieved by inherent simplification of the mechanism, which may be justified even at some compromise in performance from that produced by the structures disclosed in my said copending application.

A principal object of the present invention is to provide a fluid servo-type regulating device, such as a speed regulator including a pilot valve, arranged to be unaffected by undesirable variations in source pressure and of very simple principle to facilitate low cost construction.

Another object of the present invention is to provide a simple speed regulator for an internal combustion engine, in which the intake manifold vacuum varies as a function of the movement of a throttle, arranged to be unaffected by said undesirable variation in manifold vacuum and to utilize throttle movement or load changes to provide desirable speed droop control, and which arrangement provides unusual stability manifested as very smooth operation.

A further object of the present invention is to provide in cooperation with a speed regulating device for automotive highway driving, particularly of the type mentioned in the preceding paragraph, novel means to control the operation of the device in so simple a manner as to extend the use thereof to city and boulevard driving as well as for highway driving.

Another object of the present invention is to provide in cooperation with a speed operated device novel positive displacement liquid pump means to generate an air pressure that varies as a function of speed to operate the device in response to changes in vehicle (or engine) speed, and which pump means may include means to compensate for changes in liquid viscosity due to changes in temperature.

These and other objects which will appear more clearly as the specification proceeds, are accomplished according to the present invention, by the arrangement and combination of elements set forth in the following detailed description, defined in the appended claims and illustratively exemplified in the accompanying drawing, in which:

FIG. 1 is a schematic view of one form of speed regulator embodying the present invention operatively related to a carburetor and engine manifold or intake, as would be applied as a speed regulator for an automotive vehicle, and disclosing the novel control system therefor;

FIG. 2 is a modified form of the control system for the speed regulator shown in FIG. 1;

FIGS. 3 and 4 are schematic drawings showing modified forms of the novel pressure generator to provide air pressure that varies with speed as would be used in the speed regulator of FIG. 1; and FIG. 5 is a fragmentary view of a modification of a throttle-operated valve in the air circuit of FIG. 1.

In accordance with the broader concept of the invention I provide a regulator capable of very low-cost manufacture due to its simple construction and which is responsive to a controlled condition such as speed. In the forms shown, the regulator controls the speed of an automotive vehicle including an engine with an intake passage having a throttle therein. The regulator includes a single-acting spring-biased servo-motor with inlet and outlet restrictions to the pressure (or vacuum) side thereof, one of the restrictions being exposed to a source of varying pressure. I provide in cooperation only with the other restriction (not exposed to the source pressure) a modulating-type pilot valve means such as a pilot valve to control the pressure between the restrictions, so that in this arrangement the pilot valve is not subject to source pressure. The restriction which is exposed to the varying source pressure may be fixed or alternately may be provided with a "re-set" valve operated by or responsive to changes in the position of the throttle, depending on the application of the device. For frictionless response I provide in the inventive combination leaf-spring means to support the pilot valve, which valve may be operated by any means to provide forces varying as a function of the controlled-condition such as speed. In the form shown I provide a novel pressure generator comprising positive displacement liquid pump means driven by a rotating element of the vehicle and having an orifice in a by-pass conduit and including means to convert the liquid pressure (or vacuum) to air pressure (or vacuum) to enable remote connection from the generator to an air diaphragm acting on the pilot valve. Such pressure-converter-means comprises a chamber located between the pump rotor and the orifice and mounted horizontally so gravity will provide a liquid level, and with the air pressure above the level in open communication with the sensing diaphragm. The primary utility of this pressure generator is that the diaphragm and pilot valve portion can be mounted anywhere in relation to the pressure generator unit.

In the application of the present invention as an automatic throttle for turnpike driving, I provide control means operable only when the vehicle is in operation, such as by the transmission selector lever, to enable the device to be initially activated by the driver. In the form shown, such control means includes a valve in the source pressure line to shut off or open the source pressure to the regulator and also includes means (preferably mechanically operated) to instantly release the device upon any application of the brake pedal; and as part of the control means I further provide means operated as a function of movement of the accelerator pedal to automatically re-activate the regulator device after a partial travel of the accelerator. In the forms shown, such last-named means comprise a flexible shaft linkage to the release means mechanically operated by the accelerator; or such means may comprise a diaphragm exposed to manifold vacuum to activate the release means after the throttle opens to reduce the manifold vacuum sufficiently. In such control system, the device is automatically inactivated when the vehicle is not in operation and is activated by the driver each time he initially activates the vehicle, and thereafter the device is automatically activated upon a partial travel of the accelerator following each inactivation of the device by normal operation of the brake pedal.

Referring to FIG. 1, a speed regulator 10 for an automotive vehicle is shown to illustrate the concepts of the present invention. In FIG. 1 there is shown a conventional carburetor 12 in an engine intake passage or manifold 14 and including a throttle 16 with a lever 18, operated by an accelerator 20 through a linkage 22, all biased in the idle speed direction by an idle spring 24 and a lever 26, to be discussed hereinafter. The lever 18 and throttle 16 are operated by the regulator by means of an override member 28 having a slot 30 cooperating with a pin 32 carried by lever 18. The accelerator linkage engages lever 18 by means of a second override member 34 having a slot 36 cooperating with a pin 38 carried by lever 18.

The override member 28 is actuated by a servo-motor which in the example shown comprises a pressure responsive member, such as a diaphragm 40 having atmospheric pressure on one side thereof in chamber 42 and vacuum on the other side thereof in chamber 46. The vacuum-derived force of diaphragm 40 is biased or opposed by a spring 44 which tends to close the throttle 16 when the regulator is in operation. The vacuum in chamber 46 acting on diaphragm 40 is modulated by pilot means which in the form shown comprises a pilot valve 48 supported for frictionless movements at one end of a leaf spring member 50, which leaf member is rigidly mounted at its other end to a fixed portion of the vehicle by suitable means. The pilot valve controls a fluid circuit in which air flows through an inlet orifice or restriction 52, a conduit or passage 54 which is in open communication with chamber 46 through a branch conduit 56, then through an outlet orifice or restriction 58, and out through a conduit 60 to the intake manifold 14.

The pilot valve 48 may assume any suitable contour, but in the form shown, a ball valve is held in alignment by leaf spring 50 and is biased in a closing direction by a speeder-spring 62 to cooperate with restriction 52 to vary the aperture thereof. The pressure (vacuum) in passage 54 between the two restrictions 52 and 58 is transmitted to diaphragm 40. A variable tapered re-set valve 64 is shown operatively connected to diaphragm 40 and throttle 16 to vary the aperture of restriction 58 as a function of the position of the throttle. The valve 64 optionally may include a threaded portion 65 cooperating with a threaded cup-member 66 suitably secured to diaphragm 40. Rotation of valve 64 at the slotted end changes its relationship with the throttle 16, to provide speed-droop control.

When the pilot valve 48 is held closed by spring 62, substantially the full manifold vacuum exists in conduit 54 and chamber 46. When the pilot valve progressively is moved from its seated position to its full open position, by means to be discussed, the vacuum in conduit 54 and chamber 46 is modulated and gradually reduces to substantially the atmospheric pressure. The maximum diaphragm vacuum obtainable in chamber 46 during regular operation, such as 5 to 7 inches of mercury for example, is established when the diaphragm 40 overpowers the force of spring 44 to open throttle 16 until the vacuum reduces enough to enable the force of diaphragm 40 to balance the spring. For the same reason, the minimum manifold vacuum obtainable during regulator operation is substantially the same as this maximum diaphragm vacuum. As valve 48 gradually opens to increase pressure (reduce the vacuum) in chamber 46, diaphragm 40 is gradually moved to the right by spring 44 as a function of the travel of valve 48 to the left.

A sensing diaphragm 74 provides forces acting on the pilot valve in response to vacuum in chamber 76 varying as a function of vehicle (or engine) speed in a manner to be described. The forces of diaphragm 74 are opposed and balanced by spring 62 which is manually adjusted by an arm 78 operated by suitable shaft means 80, such as a flexible shaft controlled by the operator at the instrument panel (not shown).

A signal unit or pressure generator unit, shown by way of illustration, is generally indicated by the numeral 82 and produces the pressure in chamber 76 which varies as a function of speed in this instance. The pressure generator includes a rotary positive displacement pump, such as a gear pump having two meshing gears 84 and 86 rotating in opposite directions as shown by the arrows. One of these gears is the "idler" which is driven by the other, known as the driving gear, which in turn is driven by shaft means rotating as a function of the speed of the vehicle or engine. For automatic throttle operation, such shaft means would preferably comprise or be driven by the conventional speedometer shaft (not shown). In the form shown in FIG. 1, the gears draw liquid under vacuum from a reservoir chamber 88 through a restriction or orifice 90 into a vacuum converter or transmitter chamber 92, to be discussed, into the gear teeth and out a discharge passage or conduit 94 to the reservoir 88. The passage 94 and reservoir are maintained at approximately atmospheric pressure through a vent 96. Any suitable liquid may be used such as permanent anti-freeze liquid supplied for automobile radiators. A conduit or passage 98, such as metal or plastic tubing, connects the upper (air) portion of chamber 92 with chamber 76 so that diaphragm 74 is always subjected to the vacuum in chamber 92.

In the foregoing construction, liquid pressure (vacuum) developed by the rotating gears 84 and 86 is transmitted to diaphragm 74 by means of the pressure (vacuum) converter or transmitter chamber 92 through a body of air trapped in the passage 98 between the liquid in the transmitter chamber and the sealed sensing diaphragm 74. Rotation of the driving gear at a faster rate produces more vacuum on the liquid in the lower part of chamber 92 and on the air in the upper part of the chamber, and also in passage 98 and in chamber 76, and conversely. The static liquid level is correct if the reservoir chamber is located above the pressure converter chamber whenever vacuum is transmitted to the sensing diaphragm (as shown in FIGS. 1 and 3), and below the pressure converter chamber whenever positive pressure is transmitted to the sensing diaphragm (as shown in FIG. 4), to be described. In FIG. 1, when the gears 84 and 86 are at rest, the liquid level assumes the position in the two chambers shown by the dotted line 92a, and the air in chambers 76 and 92 is vented to the atmosphere. When the gears rotate, liquid first starts to rise in the small-volume portion of chamber 88, and when restriction 90 is "covered" and hydraulically sealed by liquid vacuum is produced in chambers 92 and 76; this action causes diaphragm 74 to progressively assume new positions to the left to balance spring 62 as the speed increases. Such re-positioning of the diaphragm causes a displacement of the air trapped in chambers 76, 92 and conduit 98. This air displacement is accommodated by a drop in the liquid level in chamber 92 to the operating level as shown. Since there is no loss of liquid, the level in the reservoir chamber 88 must rise to the operating level as shown. Thus, whenever the pump is rotating, air (under vacuum) exists on the left side of restriction 90 and liquid (at the pressure of vent 96) exists on the right side of restriction 90 to hydraulically seal same. Vent 96 could be connected to the pressure on the right side of diaphragm 74 if desired. When the vehicle is inoperative, the levels in chambers 88 and 92 are equalized at level 92a, so that air in chambers 76, 92 and conduit 98 is vented to the atmosphere through vent 96; in this manner the air pressure is unaffected by changes in altitude or temperature.

The speed-regulating action of the mechanism described thus far is as follows: When the rotary speed of the vehicle and gears 84 and 86 increases which increases the vacuum in chamber 76, diaphragm 74 pulls the pilot valve 48 to the left against spring 62 to open the restriction 52 gradually as the speed increases. This action decreases the vacuum in chamber 46 in a manner previously described, so that spring 44 expands which enables spring 26 to move throttle 16 in a closing direction tending to restore the regulated speed. When the vehicle (or engine) speed decreases, the regulating action is the reverse of that above described.

The diaphragm and spring 44 are selected to hold the throttle at its maximum opening at the highest practical diaphragm vacuum such as 5-7 inches of mercury in conduit 54 and chamber 46. As previously described, the necessary diaphragm vacuum is determined by the force of spring 44 and the size of diaphragm 40. It is desired to use as high a diaphragm vacuum as possible in order to provide sufficient force to operate the throttle and any associated linkage; however as the manifold vacuum tends to fall below this value (as when ascending steep hills) the throttle gradually closes to maintain this vacuum so that the desired regulated speed cannot be maintained. Thus the maximum diaphragm vacuum must be chosen to compromise these two opposing factors. As the valve 48 opens, the diaphragm vacuum gradually reduces from its maximum as above noted to an amount which enables spring 44 to close throttle 16, such as to 2-3 inches of mercury, for example.

It can be seen that valve 48 is exposed only to this mildly varying diaphragm vacuum in conduit 54 and not to the severely varying manifold vacuum in conduit 60, which is restricted at orifice 58. This diaphragm vacuum acting on the pilot valve provides a mild re-set action tending to reduce the speed-droop from that which normally would be produced if the pilot valve were completely balanced aerodynamically and statically. In FIG. 1, as valve 48 is opened and the vacuum in conduit 54 reduces, as explained, the vacuum-unbalance force urging valve 48 to the right gradually reduces as the throttle closes. Such reduction in vacuum force acting on valve 48 enables it to be positioned or re-set progressively more to the left as the throttle closes than its corresponding positions would be if the pilot valve were completely air balanced. Such re-positioning of the pilot valve progressively to the left effects slightly more throttle closure than with a balanced valve, which in turn reduces the speed droop. This mild re-set or speed-droop control can be varied somewhat in the design of various constant factors such as the area of orifice 52, the area of diaphragm 74, the rate of spring 62, etc.

The particular form of regulator device shown in FIG. 1 has further utility in cooperation with an internal combustion engine having throttle-varying manifold vacuum to produce unusually stable regulation. Such stability is achieved because of the single-acting servo-motor biased in a closing direction by a spring 44 and biased in an opening direction by a controlled portion of manifold vacuum. In FIG. 1, consider the stabilizing action of these elements with orifice 58 comprising a fixed restriction without the re-set valve 64, as described thus far. While the regulator mechanism is in operation, for any fixed position of the pilot valve 48, if the throttle suddenly moves slightly open for any reason, the vacuum in passage 60 reduces slightly. This action causes the vacuum in passage 54 and chamber 46 to reduce correspondingly so that spring 44 expands which enables spring 26 to move the throttle in a closing direction until the diaphragm vacuum and manifold vacuum are restored to their original values. Conversely, if the throttle suddenly closes slightly for any reason, with the pilot valve in a fixed position, the vacuum in passage 60 increases which effects a corresponding but lesser increase in vacuum in chamber 46, which opens the throttle until substantially the original values of diaphragm and manifold vacuum are restored. In this manner the device acts as a pressure regulator in which the servo-motor maintains the throttle in a position to maintain substantially constant values of diaphragm and manifold vacuum for any position of the pilot valve; and when the pilot valve assumes another position, the throttle automatically maintains another value of manifold vacuum. This type of operation is extremely smooth with a very "solid" stability since it rapidly restores the throttle position at all times at each travel-position of the pilot valve.

In my copending application, Serial No. 815,177, the pilot valve modulates simultaneously both the inlet and outlet orifices to control vacuum to the servo-motor. This double-valve control, of course, is highly desirable because it provides a larger range or change of vacuum for a given travel of the pilot valve. While the pilot valve control system of the present invention lends itself to lower cost manufacture, the valve 64 may be provided to approach the effect of the two-valve pilot-valve of this copending application, and also for speed-droop control. For example, when the regulator device is stable and the speed increases, the pilot valve 48 opens to lower the vacuum in chamber 46 which reduces the throttle-opening and moves valve 64 to the right, thereby slightly increasing the restrictive effect of orifice 58. This action reduces the vacuum in conduit 54 and chamber 46 more than if the re-set valve were not used so that spring 44 moves the throttle slightly more closed. In this manner, a larger change in diaphragm vacuum and hence a larger travel of throttle 16 is provided for a given travel of the pilot valve 48. For the stability action above-described, it is desirable for the vacuum in chamber 46 to increase correspondingly when the manifold vacuum increases at fixed positions of the pilot valve. This result can be controlled by the rate of change of valve 64.

The valve and its re-set action as above-described can provide any desired speed-droop by proper calibration of its contour. The form of the valve shown in FIG. 1 will decrease the speed-droop progressively as the taper of the valve is increased.

The inherent slower action of the simplified system of the present invention can be further improved by the double abutment or override mechanism comprising elements 28, 30, 32, 34, 36, 38. This mechanism enables the use of a smaller diaphragm 40 since the diaphragm must only operate lever 18 and throttle 16 in its regulating action. The diaphragm 40 does not operate the accelerator 20 and its linkage 22 with its undesirable friction; and the reduced air displacement of diaphragm 40 enables a faster action thereof for a given travel of pilot valve 48.

All automatic throttle devices now in use are so arranged that the vehicle must actually attain the set speed before the regulating mechanism can be engaged. These present devices all would accelerate the vehicle much too rapidly if means were provided to enable engagement before the vehicle attains the set speed. Such devices would accelerate the vehicle at or near wide-open-throttle from the engaged speed to the set speed, and the "roar" of the engine accompanying such fast acceleration can dangerously startle the operator. It would be highly desirable for the speed regulating device to provide sufficiently slow acceleration that it can be safely engaged at any speed below the set speed; this arrangement would cause the vehicle automatically to accelerate slowly or moderately from the engaged speed to the set speed. It would be particularly desirable to cause the automatic engagement after a partial travel of the throttle or accelerator so that the control device cannot be engaged when the engine is idling. Then after the vehicle attains a partial speed or the throttle is consciously opened partially, the regulator device engages and automatically accelerates the vehicle slowly to the set sped. This control system is more desirable than present control systems because (1) the operator does not have to wait until the set speed is attained each of the many times the device must be engaged in normal driving and (2) it is unnecessary to rely on a "push-back" force or other signals of sound or sight to indicate when the operator can remove his foot from the accelerator. This is true because after the operator "feels" the device start to accelerate automatically, he can move his foot and the vehicle will automatically seek out and stop accelerating at exactly the set speed in each of the many times the device must be engaged in normal driving. In actual practice I have found that these two advantages greatly expand the use of these speed regulators to include city driving (on main streets and boulevards) as well as for highway driving.

Such desirable control system is disclosed in the present invention. In FIG. 1, for this purpose, as explained previously, the spring 44 is selected so that the diaphragm vacuum in chamber 46 is never more than a pre-selected value, such as 5–7 inches of mercury for example, which is a minimum for the manifold vacuum. The throttle opening at the minimum manifold vacuum corresponding to this maximum diaphragm vacuum restricts the acceleration rate sufficiently to enable safe automatic acceleration. The acceleration rate can be further retarded by mountnig the pressure generator unit in the vehicle, as shown in FIG. 1 (see arrow indicating vehicle direction), such that the reservoir chamber 88 is located toward the rear of the vehicle and the pressure converter chamber 92 is located toward the front. Then when the vehicle accelerates (to the left) the liquid pressure at the entrance of orifice 90 is slightly reduced by inertia forces of the liquid in chamber 88. This liquid-inertia effect tends to slightly increase the vacuum in chambers 92 and 76 over that normally produced without acceleration. Accordingly, the pilot valve 48 is open slightly more than normal so that the throttle 16 is closed slightly more than without acceleration, thereby affecting the acceleration.

In order to utilize the foregoing manifold vacuum method of the present invention in which moderate acceleration is effected, control means for the regulator device are provided to enable automatic acceleration after a partial travel of the accelerator; such control means also includes means to release the regulator at least upon all brake actuations as well as by selective manual release, and also includes restraining means operable upon inactivation of the vehicle to automatically render the regulator device inoperative. In FIG. 1, by way of illustration, such control means comprise a valve member 100 movable vertically, as shown, to open or close the flow of air through conduit 60. Valve 100 is connected by a flexible shaft 102 to a plunger 104 biased by a spring 106 to abut the suspended brake pedal arm 108. As shown in FIG. 1, the regulator device is then in operation since conduit 60 is open. Depression of the brake pedal 108a closes valve 100 to shut off vacuum to chamber 46 so that spring 44 expands which enables spring 26 to close throttle 16. A small orifice 68 may optionally be provided for enabling air to fill chamber 46 faster than by only the bleed past valve 48. When valve 100 moves up in FIG. 1, a detent 110 is biased leftwardly by a spring 112 under the valve to lock it in its closed position even after releasing pedal 108a. When accelerator 20 is depressed a predetermined amount, a cam 114 enables a follower 116 to be biased upwardly by a spring 118, which pulls detent 110 free of valve 100 through a flexible shaft 120 having lost-motion connection 122 with follower 116. Spring 106 then instantly opens valve 100 to transmit vacuum to diaphragm 40 for opening the throttle and providing automatic but moderate acceleration to the set speed as predetermined by the setting of spring 62. When the brake pedal 108a is again depressed the foregoing cycle is repeated.

When the vehicle is inactivated, a transmission selector lever 124 operates the restraining means illustrated herein as follows; a cam 126 is operated by the lever through a shaft 128 to act on a cam follower plate 130 secured to valve 100 by suitable means. When the lever 124 is placed in at least "neutral" position and possibly "park" and "reverse" positions, cam 126 acts to close valve 100 and inactivate the regulator. In order to activate the regulator again, it is necessary to place the transmission lever in "drive" (or "high gear") position and depress the accelerator until detent 110 releases valve 100. A release knob 132 may optionally be provided to manually shut off valve 100, and open it while driving, through a lever 134 and a pin 136 acting on an arm 138 secured to plunger 104.

FIG. 2 shows an alternate form of control system in which the shaft 120 is actuated by a diaphragm 140 exposed to the manifold vacuum in conduit 60 and biased to the right by a spring 142. When the engine is idling, the manifold vacuum moves diaphragm 140 and its shaft 120 to the left which enables spring 112 to move detent 110 to lock valve 100 when it closes conduit 60 as above described. When the throttle is opened enough to reduce the manifold vacuum to an amount enabling spring 142 to move diaphragm 140 and detent 110 to the right, the valve 100 is instantly opened by spring 106 (FIG. 1) and the vehicle then accelerates automatically to the speed predetermined by spring 62 as above described.

FIG. 3 is a modification of the pressure generator 82 in FIG. 1 arranged to eliminate all liquid inertia effects where it might be desirable in some applications of the basic governing mechanism. The construction in FIG. 3 includes merely a symmetric duplication of the reservoir 88, passage 94 and restriction 90 as elements 88', 94' and 90', respectively; and other common elements have the same reference numerals. With this arrangement, any inertia effects in one direction (left or right in FIG. 3) tending to change the vacuum in chamber 92 due to liquid-inertia effects in one reservoir would be cancelled by the same but opposite liquid-inertia effects in the other reservoir.

FIG. 4 is another modification of the pressure generator of FIG. 1 arranged to produce positive air pressure instead of vacuum (negative pressure) varying as a function of speed. Elements in FIG. 4 common to the form in FIG. 1 carry the same reference numerals. In FIG. 4, the gears 84 and 86 rotate reversely from that in FIG. 1 to reverse the direction of liquid flow. Also, the reservoir chamber 88 is located below the pressure transmitter chamber 92. Conduit 98 communicates with a sealed chamber 150 to direct air pressure on diaphragm 74 which actuates valve 48 through the sealed shaft 48a. When the gears at at rest, the liquid is at level 92a. When the speed increases, the liquid rises in chamber 92 to level 92b for accommodating the displacement of diaphragm 74 as it moves valve 48 to the left. Simultaneously, the liquid in reservoir chamber 88 lowers from level 92a since no liquid is gained or lost. The operation of the pressure generator and the regulator mechanism is otherwise the same as above described, except for liquid-temperature compensation means to be discussed. In order to obtain desired liquid-inertia effects, the generator is mounted reversely as in FIG. 1. This is indicated by the arrow showing vehicle direction in FIG. 4, so that the pressure transmitter chamber 92 is toward the rear of the vehicle and the reservoir chamber 88 is toward the front. If desired, the inertia effects can be eliminated by the symmetric arrangement of FIG. 3 applied to FIG. 4 in which the pressure transmitter chamber would be above the reservoir chambers.

In any of the forms of the pressure generator unit disclosed herein, means may be provided to compensate for changes in liquid viscosity produced by changes in temperature. Such means are illustrated in FIG. 4 as a second by-pass circuit comprising a passage 152, a chamber 154, and passage 156, all in parallel with the passage 94, restriction 90, and transmitter chamber 92. A bimetal element 158 is suitably secured to the pump housing and carries a valve 160 cooperating with passage 156 to comprise a second restriction or orifice in parallel with the restriction 90. When the liquid is cold, the bimetal element assumes a position 158' to hold valve 160 open. As the liquid temperature rises, valve 160 gradually closes to compensate for the reduction in viscosity by further restricting the flow through passage 152. Ideally, valve 160 should maintain a constant value of vacuum in chamber 92 and on diaphragm 74 at each constant speed irrespective of changes of temperature and viscosity. While starting the vehicle at extremely cold temperatures when the oil is unusually viscous, the gears 84, 86 might pump all the oil into the reservoir chamber 88 in FIG. 1 or into the transmitter chamber 92 in FIG. 4, and would thereafter tend to pump air until the temperature rises enough to thin the oil sufficiently for normal operation. For this extreme condition in FIG. 1, it is only necessary to provide sufficient volume in reservoir chamber 88 to receive all the oil in the system; and in FIG. 4 to provide sufficient volume in the transmitter chamber 92 to receive all the oil in its system. If desired, the bimetal valve 160 can be disposed to act directly on restriction 90, with the consequent elimination of passages 152, 154 and 156.

Any pressure generator may be used to provide a pressure which varies with speed in the regulator combination above described, such as the centrifugal liquid pressure generator disclosed in my copending application Serial No. 683,318, now Patent No. 3,084,758 and which is independent of liquid viscosity effects. However, the pressure generator unit of FIGS. 1, 3 and 4 herein have particular utility in the regulator combination because of their capability of relatively small size and low cost manufacture. While the pressure generator above described is not so accurate or consistent as the centrifugal-liquid unit in Serial No. 683,318, it is sufficiently accurate and consistent to be acceptable in providing a low cost automotive speed regulator. For the same reasons, the pressure generator units of FIGS. 1, 3 and 4 can have utility, per se, for applications other than as a speed regulator.

FIG. 5 shows a modification of the apparatus shown in FIG. 1 in that the re-set valve designated 64 of FIG. 1 is reversed in form and is shown as re-set valve 64a in FIG. 5. This alternate construction may be used in any regulator application in which it may be desired to provide a broader speed-droop than normally would be provided with only the restriction 58 (and without the valve 64a). With this construction, when the valve 48 opens as the speed increases, diaphragm 40 reduces the opening of throttle 16. This action increases the opening of valve 64a which thereby increases the vacuum in chamber 46 more than without the valve 64a; this re-set effect retards further closing of the throttle so that the speed-droop would be increased. As used herein, and in the appended claims, the term "speed-droop" means the value or amount of speed variation as the load on the regulated engine changes throughout its operating load range.

When the terminology in the claims recite the principles disclosed herein in terms of engine speed, it should be understood that vehicle speed and engine speed are to be interpreted synonymously in construing the invention defined by these claims. This is true, particularly for so-called "automatic throttle" devices for constant road-speed operation, as shown in FIG. 1, since at higher cruising speeds, the slippage of an automatic transmission is very slight so that engine speed is very nearly proportional to road speed.

I wish it understood that my invention is not limited to any specific construction, arrangement or form of the parts, and is capable of numerous modifications and changes without departing from the spirit and scope of the claims.

What I claim is:

1. In a fluid mechanism having rotary means therein to produce gas pressure which varies as a function of the speed of rotation of said rotary means, the combination of, liquid pump means included in said rotary means to produce a liquid pressure which varies as a function of said rotary speed, by-pass conduit means to circulate liquid from the outlet of said pump means back to the inlet thereof, restriction means in said by-pass conduit means, a chamber associated with said conduit means between said restriction means and said pump means for converting said liquid pressure to a gas pressure which varies with speed, said chamber including a mass of gas hydraulically sealed and trapped in said chamber at all times during operation of said mechanism when said liquid covers said restriction, said chamber including means to vent said gas to a constant reference pressure each time and only when said rotary means is at rest, and temperature-sensitive valve means operatively associated with said by-pass conduit means to decrease the resistance to flow of said liquid as its temperature decreases and to increase the resistance to flow of said liquid as its temperature increases, to render said gas pressure substantially independent of temperature variations of said liquid.

2. In a fluid mechanism having rotary means therein to produce gas pressure which varies as a function of the speed of rotation of said rotary means, the combination of, positive displacement liquid pump means included in said rotary means to produce a liquid pressure which varies as a function of said rotary speed, by-pass conduit means to circulate liquid from the outlet of said pump means back to the inlet thereof, restriction means in said by-pass conduit means, a chamber associated with said conduit means between said restriction means and said pump means for converting said liquid pressure to a gas pressure which varies with speed, pressure-sensitive means exposed to said chamber and subjected to said gas pressure, said chamber including a substantially fixed mass of gas hydraulically sealed and trapped therein during operation of said mechanism when said liquid covers said restriction to transmit said liquid pressure to said pressure-sensitive means, said chamber including means to vent said gas to a constant reference pressure each time and only when said rotary means is at rest, and second by-pass conduit means in parallel with said first-named by-pass conduit means, valve means in said second by-pass conduit means to increase the restrictive effect thereof as the temperature of said liquid increases, and to decrease the restrictive effect thereof as the temperature of said liquid reduces.

3. In a fluid mechanism, the combination of; rotary pressure generator means including pumping means to produce a flow of liquid under pressure that varies as a function of the speed of rotation of said rotary means, pressure transmitter means communicating with said rotary means and including a trapped mass of gas to convert said liquid pressure to gas pressure also varying as a function of the speed of rotation of said rotary means during normal operation of said mechanism, said pressure transmitter means including means to vent said mass of gas to a constant reference pressure each time and only when said rotary means is at rest, said vent means being covered by said liquid to hydraulically seal said transmitter means to be leakproof whenever said rotary means is in motion, and temperature-sensitive means operatively associated with said liquid flow to compensate for changes in the viscosity of said liquid as its temperature changes to render said gas pressure substantially independent of temperature variations of said liquid.

4. In a fluid mechanism, the combination of; rotary pressure generator means including pumping means to produce a flow of liquid under pressure that varies as a function of the speed of rotation of said rotary means, pressure transmitter means communicating with said pumping means and including a trapped mass of air to convert said liquid pressure to air pressure also varying as a function of the speed of said rotary means, orifice means communicating with said pumping means and said pressure transmitter means and disposed to vent said transmitter means to the existing atmosphere adjacent said pumping means when said rotary means is at rest, said orifice means being located in relation to said pumping means and said pressure transmitter means to be hydraulically closed by the liquid flowing through said orifice means from the outlet of said pumping means, whereby to effect said entrapment of air during normal operation of said mechanism, and temperature-sensitive means operatively associated with said liquid flow to compensate for changes in the viscosity of said liquid as its temperature changes to render said air pressure substantially independent of temperature variations of said liquid.

5. In a fluid mechanism, the combination of rotary means including positive displacement pumping means to produce a flow of liquid under pressure that varies as a function of the speed of rotation of said rotary means, pressure transmitter means communicating with said pumping means and including trapped air to convert said liquid pressure to air pressure also varying as a function of the speed of rotation of said rotary means during normal operation of said mechanism, and means to vent said trapped air to the surrounding atmospheric pressure only when said rotary means is at rest, said venting means including restriction means located in relation to said pressure transmitter means to be slightly above the level of liquid in said mechanism when said rotary means is at rest and disposed to be covered by said liquid substantially immediately upon initial rotation of said pumping means to seal said air in said pressure transmitter means at substantially the same time that said restriction means is sealed by said liquid, and temperature-sensitive valve means operatively associated with said liquid flow to decrease the resistance to flow of said liquid as its temperature decreases, and conversely, to render said air pressure substantially independent of temperature variations of said liquid.

6. In a speed-responsive device, the combination of; rotary pressure generator means including positive displacement pumping means to produce liquid pressure that varies as a function of the speed of rotation of said rotary means, said pressure generator means also including by-pass conduit means to circulate liquid from the outlet of said pumping means back to the inlet thereof, a restriction in said conduit means, pressure transmitter means communicating with said conduit means between said restriction and said pumping means on the side thereof producing a pressure varying with speed, said pressure transmitter means including a mass of gas sealed and trapped therein by said liquid only when and after same covers said restriction to convert said liquid pressure to gas pressure also varying as a function of the speed of said rotary means during normal operation of said device, said restriction being located in relation to said pressure transmitter means to be slightly above the level of liquid in said device when said rotary means is at rest and disposed to be covered by said liquid substantially immediately upon initial rotation of said pumping means to cause said entrapment of said gas in said pressure transmitter means at substantially the same time that said restriction is sealed by said liquid, means to vent said gas through said restriction to the surrounding atmospheric pressure when said rotary means is at rest, means responsive to changes of pressure of said mass of gas, and temperature-sensitive valve means operatively associated with said by-pass conduit means to compensate for the changes in the viscosity of said liquid as its temperature changes to render said gas pressure substantially independent of temperature variations of said liquid.

7. In a fluid mechanism having rotary pressure generator means therein to produce gas pressure which varies as a function of the speed of rotation of said rotary means, the combination of; positive displacement liquid pump means included in said rotary means, by-pass conduit means to circulate liquid from the outlet of said pump means back to the inlet thereof, restriction means in said conduit means, a gas chamber associated with said conduit means between said restriction means and said pump means, pressure-responsive means comprising a movable wall of said gas chamber and movable in response to changes in the pressure of said gas therein varying as a function of said rotary speed and providing forces also varying with said speed, said conduit means including pressure-transmitter means adjacent to and enclosing said gas chamber for converting said liquid pressure to equivalent gas pressure, said gas chamber including a substantially fixed mass of gas hydraulically sealed and trapped in said chamber at all times during operation of said mechanism to transmit said liquid pressure undiminished to said pressure-responsive means for operation thereof, a liquid reservoir chamber in said conduit on the opposite side of said restriction means from said pressure transmitter means and having a liquid level the same as the level of liquid in said pressure transmitter means adjacent said gas chamber when said rotary means is at rest, said reservoir chamber being disposed to enable its liquid level to change from said rest-level in the direction of liquid flow in said conduit as the speed of said rotary means increases while the liquid level in said transmitter means simultaneously changes in a direction opposite from said first-named direction, and temperature-sensitive valve means operatively associated with said by-pass conduit means to decrease the resistance to flow of said liquid as its temperature decreases, and conversely, to render said gas pressure substantially independent of temperature variations of said liquid.

8. In a fluid mechanism having rotary means therein to produce gas pressure which varies as a function of the speed of rotation of said rotary means, the combination of; positive displacement liquid pump means included in said rotary means, by-pass conduit means to circulate liquid from the outlet of said pump means back to the inlet thereof, restriction means in said conduit means, a gas chamber associated with said conduit means between said restriction means and said pump means, said restriction means being located in relation to said chamber to be slightly above the level of liquid when said rotary means is at rest and disposed to be covered by said liquid substantially immediately upon initial rotation of said pump means to seal said chamber at substantially the same time that said restriction means is sealed by said liquid, pressure responsive means comprising a movable wall of said gas chamber and movable in response to changes in the pressure of said gas therein varying as a function of said rotary speed and providing forces also varying with said speed, said conduit means including pressure transmitter means adjacent to and enclosing said gas chamber for converting said liquid pressure to equivalent gas pressure, said gas chamber including a substantially fixed mass of gas sealed and trapped in said chamber by said liquid only when and after same covers said restriction means during operation of said mechanism to transmit said liquid pressure to said pressure responsive means for operation thereof, means to vent said chamber through said restriction means to the surrounding atmospheric pressure when said rotary means is at rest, whereby the operation of said pressure transmitter means is consistent, a second by-pass conduit is parallel with said first-named by-pass conduit, valve means in said second by-pass conduit to control the restrictive effect thereof in response to changes in the temperature of said liquid.

References Cited by the Examiner

UNITED STATES PATENTS

| | | | |
|---|---|---|---|
| 213,467 | 3/79 | Storer | 73—502 |
| 470,468 | 3/92 | Boyer | 73—497 |
| 574,076 | 12/96 | Scholtfeldt | 73—502 |
| 675,564 | 6/01 | Kent | 73—523 |
| 1,566,995 | 12/25 | Standerwick | 137—20 |
| 2,431,816 | 12/47 | Mallory | 123—103 |
| 2,621,482 | 12/52 | Meade | 123—103 |
| 2,810,461 | 10/57 | Seay | 192—3 |
| 2,872,541 | 2/59 | Oppenheim | 60—52 |
| 2,911,078 | 11/59 | Baker | 192—3 |
| 2,913,877 | 11/59 | Stelzer | 60—52 |
| 2,988,004 | 6/61 | Ashton | 103—41 |
| 3,003,422 | 10/61 | Bessiere | 103—41 |

FOREIGN PATENTS

| | | |
|---|---|---|
| 524,556 | 5/21 | France. |
| 1,011,698 | 4/52 | France. |
| 2,675 | 1885 | Great Britain. |

RICHARD C. QUEISSER, *Primary Examiner.*

B. G. DURHAM, ROBERT L. EVANS, JAMES J. GILL, *Examiners.*